US005204654A

United States Patent [19]

Hay

[11] Patent Number: 5,204,654

[45] Date of Patent: Apr. 20, 1993

[54] FUSE HOUSING HAVING FLUID SEALING ASSEMBLY

[75] Inventor: Noah D. Hay, Wingate, N.C.

[73] Assignee: Cooper Industries, Inc., Houston, Tex.

[21] Appl. No.: 786,198

[22] Filed: Oct. 31, 1991

[51] Int. Cl.[5] ........................ H01H 85/02; H02H 7/04

[52] U.S. Cl. .................................... 337/204; 337/205; 361/41; 361/38

[58] Field of Search ............................ 361/38, 39, 41; 337/202, 204, 205, 210, 211, 280, 194, 186

[56] References Cited

U.S. PATENT DOCUMENTS 2,647,939 3/1951 Paluev .
3,628,092 12/1971 Keto .................................... 337/186
3,732,517 11/1971 Keto et al. .
3,916,260 10/1975 Westrom et al. ...................... 361/41
4,010,437 3/1977 Macemon et al. .................. 337/204

*Primary Examiner*—Harold Broome
*Attorney, Agent, or Firm*—Eddie E. Scott; William B. Patterson; Alan R. Thiele

[57] ABSTRACT

A fuse housing for an oil-cooled transformer that uses a stopper to prevent oil from escaping the transformer tank as the fuse and fuse holder are removed. During normal operation, the stopper is held in an open position by the fuse holder. When the fuse and fuse holder are removed, the stopper closes and seals the upper end of the holder, preventing oil from draining through the upper portion of the fuse housing and escaping from the transformer tank.

9 Claims, 3 Drawing Sheets

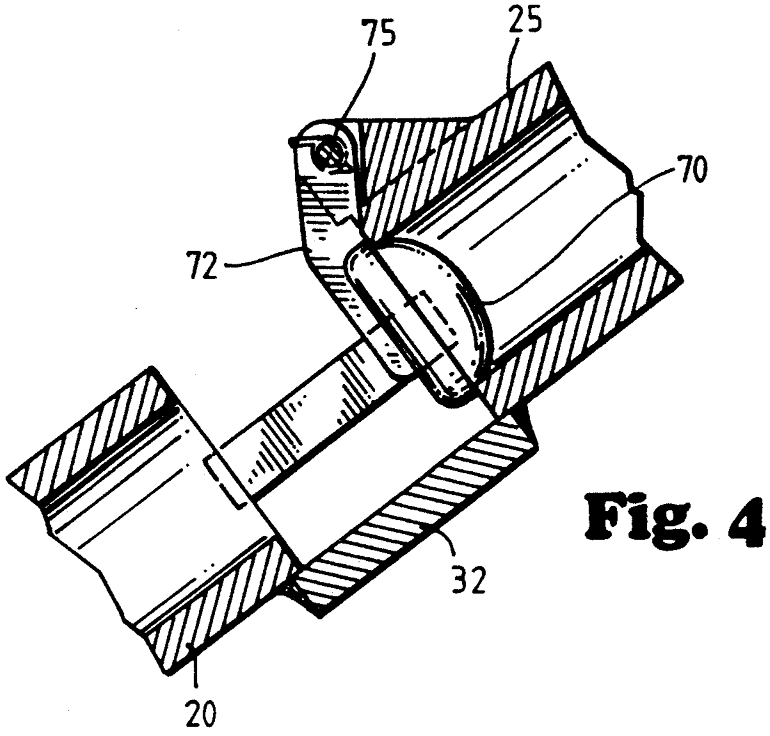
Fig. 4
Fig. 5
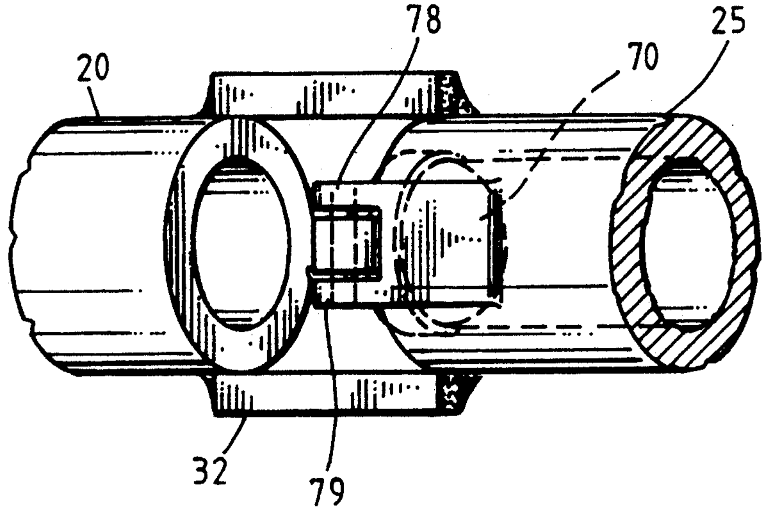

FUSE HOUSING HAVING FLUID SEALING ASSEMBLY

BACKGROUND OF THE INVENTION

This invention relates in general to protective fuse assemblies for liquid-cooled transformers. More particularly, the invention relates to a sealing mechanism to prevent oil from escaping the confines of a transformer tank when a submerged, bayonet-type circuit breaker or fuse is removed from a transformer tank. The bayonet-style fuse is designed to operate under oil and be easily replaceable after operation. The fuse serves to protect an electrical system from overload or transformer failure resulting in a short circuit. In this type device, a fuse is inserted into a tubular housing mounted in a tank and having a pair of contacts in its bottom, lower end. The fuse is installed by attaching it to one end of a fuse holder which is then pushed through the opening in the transformer tank wall and into the fuse housing until the fuse is submerged in oil between the two contacts. The opposite end of the fuse holder seals the top opening in the fuse housing. After the fuse has operated, the fuse and holder are withdrawn from the housing and a new fuse is attached to the holder and inserted.

While the forgoing design allows quick removal of the fuse, it requires the air-oil interface to be well below the tank wall opening to prevent oil from draining through the tank wall opening in the fuse housing as the fuse and holder are withdrawn. Even with the air-oil interface below the tank wall opening, certain factors like heat and pad-tilt can cause the oil level to rise to a point above the opening in the tank wall. For example, on larger pad-mounted transformers, temperature induced oil height variations cause the oil level to fluctuate between −2.63" and +3.25" on a 72" high tank. In addition, a pad-tilt of 2 or 3 degrees can shift the oil height an additional 1" on a 40" deep (front to back) tank. When the fuse is removed while the oil height is elevated, oil escapes from the fuse housing opening causing contamination of the transformer oil and possible damage to rubber termination systems mounted onto the transformer front plate.

Another, more critical problem arises when the oil level becomes too low causing the top contact of the fuse to be exposed to air. This causes a danger for personnel removing the fuse as an arc between the upper contact and the transformer wall can result.

There is a need therefore, for a sealing system for use with a bayonet-style fuse assemblies wherein the fluid level of transformer oil can be kept well above the fuse contacts without concern of oil escaping through the tank wall as the fuse is withdrawn.

SUMMARY OF THE INVENTION

The circuit breaker sealing assembly of the present invention provides a fuse housing for an oil-cooled transformer that prevents oil from escaping the transformer tank as the fuse is removed from the housing. The housing extends at a downward angle from the transformer wall into the interior of the transformer tank and contains electrical contacts which hold an expulsion fuse. The invention includes a spring-loaded arm and stopper mounted adjacent to an opening in the bottom of the upper housing and a flexible O-ring mounted in the inside of the upper housing. When a fuse and fuse holder are inserted into the fuse housing, the arm is forced away from the opening allowing the fuse to pass. During normal operation, the stopper is held in an open position by the fuse holder. When the fuse and fuse holder are removed, the stopper closes and seals the end of the holder, preventing oil from draining through the upper portion of the fuse housing and escaping from the transformer tank. The flexible 0-ring serves as a secondary seal to prevent oil leakage while the stopper is open and to wipe oil from the fuse and fuse holder as they are removed.

BRIEF DESCRIPTION OF THE FIGURES

A better understanding of the present invention may be had by reference to the figures wherein:

FIG. 4 is a side view of the stopper assembly that is the subject of the present invention; and FIG. 5 is a rear view of the stopper assembly.

DESCRIPTION OF PREFERRED EMBODIMENT

Figure 1:
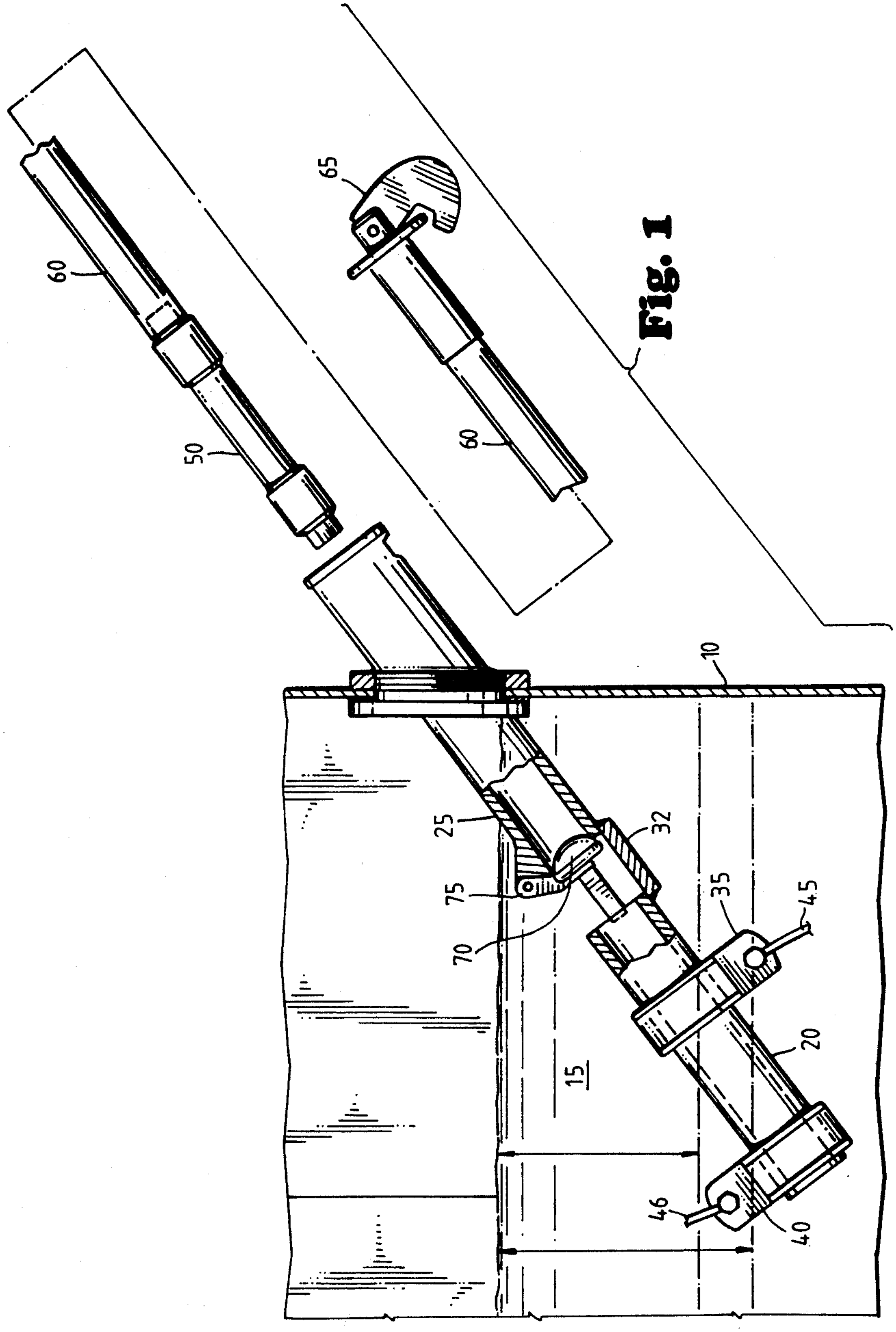
FIG. 1 is an exploded view of the fluid sealing system that is the subject of the present invention.

The present invention can be better understood by reference to FIG. 1. A transformer tank 10 is partially filled with dielectric fluid 15 for insulation and cooling purposes. The transformer tank includes a fuse housing, the upper portion 25 of which extends through the wall cf the transformer tank. The inside, lower portion 20 of the fuse housing is equipped with two band-shaped contacts which are electrically connected to terminals 35 and 40. The upper 25 and lower 20 portions of the fuse housing are separated by a rib 32.

Still referring to FIG. 1, the fuse that operates between terminals 35 and 40 consists of a fuse cartridge 50 with conductive metal on each end. The fuse cartridge is attached to a fuse holder 60 which is shown in two pieces in FIG. 1. Fuse holder 60 includes handle assembly 65 with a latching mechanism to allow the fuse holder to be securely attached at the top of the upper housing 25.

Figure 3:
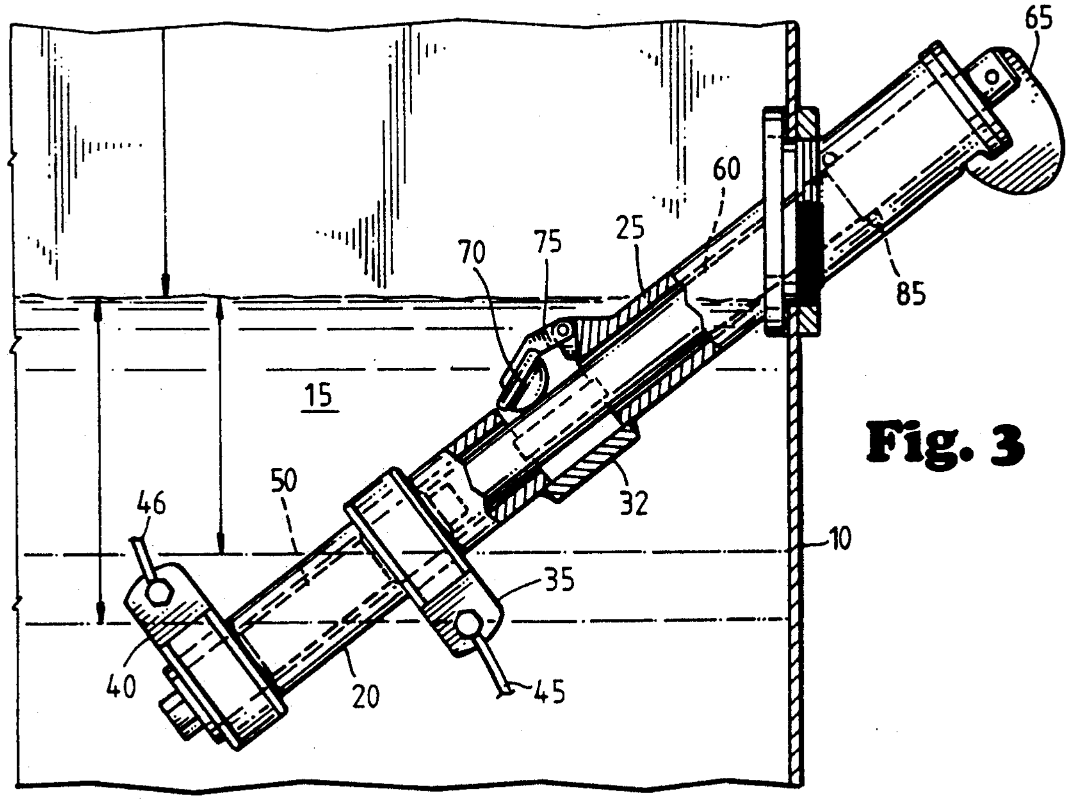
FIG. 3 is another side view of the invention.

The fuse in operation can best be understood by reference to FIG. 3. In the Figure, the fuse holder 60 and fuse cartridge 50 have been inserted into the fuse housing. Fuse cartridge 50 is electrically connected to terminals 35 and 40. The fuse holder remains in the housing until the fuse has operated at which time the fuse cartridge and holder are removed and a new cartridge attached.

Figure 2:
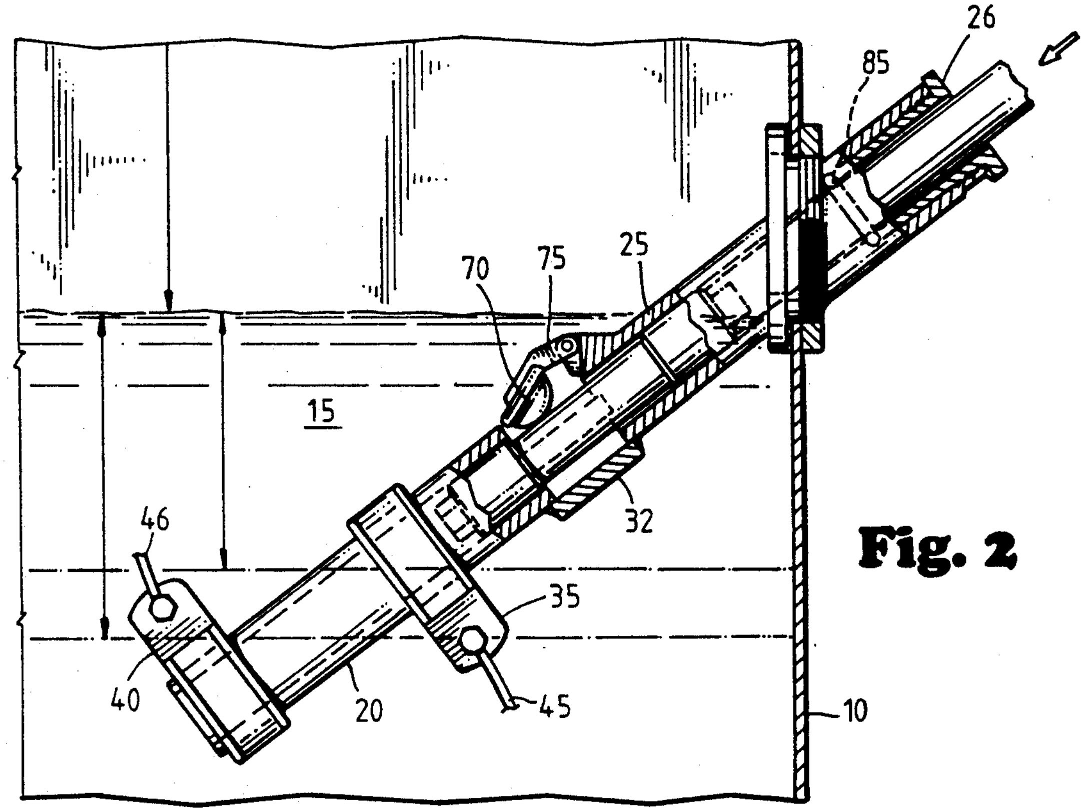
FIG. 2 is a side view of the invention.

The invention that is the subject of the present application concerns a sealing assembly used to prevent transformer oil from escaping through the opening at the side of the transformer tank when the fuse cartridge and fuse holder are removed. As can be seen in FIG. 2, the assembly includes a spring-loaded stopper 70 which is located adjacent to the bottom opening in the upper housing 25. As shown in FIG. 2, the stopper is forced open as the fuse and fuse holder are inserted in to the housing. As shown in FIG. 3, the stopper remains open during normal operation when the fuse is in place and the fuse holder has been secured to the upper housing. As shown in FIG. 1, as the fuse cartridge and holder are removed, the stopper closes and seals the bottom opening in the upper housing, preventing transformer oil from entering the upper housing and escaping through the opening in the transformer wall.

FIGS. 4 and 5 show the stopper assembly in greater detail. FIG. 4 shows the stopper 70 as it seals the opening in the upper housing. The stopper is connected to a spring-loaded arm (spring now shown) 72 which is pivotly attached by a pin 75 between two arms 78, 79 which are molded into the outer surface of the upper housing.

An additional portion of the sealing assembly can be seen in FIG. 2. Towards the top of upper housing 25 is an O-ring 85 seated around the inner circumference of the housing. The O-ring sits on a shoulder produced by a reduced inside diameter of the upper housing below the ring. A threaded sleeve 26 is inserted into the upper housing above the O-ring. While the fuse and holder are installed and the primary stopper seal is broken, the O-ring serves as a secondary seal to prevent oil from escaping to the outside of the tank. When the fuse holder and cartridge is removed, the O-ring wipes oil from the surface of the holder and cartridge as they pass through it. In this manner additional transformer oil is prevented from escaping out the opening in the upper housing as a spent fuse cartridge is removed. While the secondary seal consists of a flexible O-ring in the preferred embodiment, it will be understood that any number of different materials could be used to provide secondary sealing and to remove the residual oil at the mouth of the fuse housing. For example, the ring could be multi-sided or made of teflon with an inherent bias applying force to the fuse holder. In addition, a groove could be cut into the inside diameter of the upper housing to prevent upwards or downwards movement of the ring without the use of a threaded sleeve.

There is thereby provided by the device of the present invention an apparatus for sealing a bayonet-style fuse assembly to allow transformer fluid height to be of adequate height to ensure the fuse contacts remain covered with oil.

While the fluid sealing assembly of the present invention has been described by reference to its preferred embodiment, it will be understood that other various embodiments of the device and method of the present invention may be possible by reference to the specification and the appended claims. Such additional embodiments shall be included within the scope of the appended claims.

I claim:

1. A fuse housing for a bayonet-type fuse, said fuse housing comprising:

a substantially tubular housing, said housing mountable in a transformer body and having an upper and lower portion, said upper portion accessible from an area outside of said transformer body, said lower portion of said housing constructed and arranged to hold said fuse in fluid, said upper and lower housing portions being connected by at least one rib; and means for sealing a distal end of said upper portion of said housing to prevent introduction of said fluid into said upper portion of said housing as a fuse holder and said fuse are removed.

2. The fuse housing in claim 1, further including:

a pair of contacts in said lower portion of said housing, a first contact constructed and arranged to conductively contact a proximal end of said fuse and a second contact constructed and arranged to conductively contact a distal end of said fuse.

3. The fuse housing in claim 1, wherein said fuse holder includes:

a substantially tubular, removable body having means for attachment to said fuse, said holder having means for insertion and removal of said fuse into said housing.

4. The fuse housing in claim 1, wherein said means for sealing the distal end of said upper portion of said housing includes:

an arm and a stopper, said arm pivotally attached with a pin between two spaced arms, said spaced arms integrally formed upon a surface of said upper portion of said housing, said stopper constructed and arranged to cover and seal said distal end of said upper portion of said housing in the absence of said fuse and said fuse holder and to be urged and held away from said distal end of said upper portion of said housing by said fuse and said fuse holder upon insertion of said fuse and said fuse holder.

5. The fuse housing of claim 4, wherein said arm and said stopper are equipped with a spring means for urging said arm and stopper toward said distal end of said upper portion of said housing.

6. The fuse housing of claim 1, further including a second means for sealing of said upper portion of said housing and for wiping an exterior of said fuse holder thereby preventing said fluid from reaching the outside of said transformer body.

7. The fuse housing in claim 6 wherein said second means for sealing said upper portion of said housing and wiping said exterior of said fuse holder includes;

at least one flexible ring coaxially mounted around an interior wall of said upper portion of said housing, an inside diameter of said ring being slightly smaller than an outside diameter of said fuse holder, said ring constructed and arranged to seal an annular surface between said fuse holder and said interior wall of said upper portion of said housing and wipe the outside of said fuse holder removing excess fluid as said fuse holder is withdrawn from said upper portion of said housing.

8. The fuse housing in claim 7 wherein downward movement of said ring is prevented by a shelf formed by a reduced inside diameter of said upper housing and upward movement of said ring is prevented by a threaded cap constructed and arranged to fit inside said upper portion of said housing and terminate above said ring, holding said ring against said shoulder.

9. The fuse housing in claim 7 wherein axial movement of said ring is prevented by a groove located in the inside of said upper portion of said housing.

* * * * *